United States Patent [19]
Boutaud et al.

[11] Patent Number: 5,787,481
[45] Date of Patent: Jul. 28, 1998

[54] SYSTEM FOR MANAGING WRITE AND/OR READ ACCESS PRIORITIES BETWEEN CENTRAL PROCESSOR AND MEMORY OPERATIONALLY CONNECTED

[75] Inventors: Frederic Boutaud, Chemin des Martels, France; Sigheshi Abiko, Tokyo, Japan

[73] Assignee: Texas Instruments Incorporated, Dallas, Tex.

[21] Appl. No.: 847,550

[22] Filed: Apr. 23, 1997

Related U.S. Application Data

[63] Continuation of Ser. No. 408,795, Mar. 23, 1995, abandoned.

[30] Foreign Application Priority Data

Mar. 24, 1994 [FR] France .................... 94 03925

[51] Int. Cl.$^6$ .................. G06F 12/00; G06F 13/00
[52] U.S. Cl. .................. 711/151; 364/DIG. 1; 364/DIG. 2; 364/246.1; 711/150; 711/154; 711/168
[58] Field of Search .................. 364/DIG. 1, DIG. 2, 364/246.1; 711/150, 151, 154, 168, 210, 211

[56] References Cited

U.S. PATENT DOCUMENTS

| | | | |
|---|---|---|---|
| 4,792,926 | 12/1988 | Roberts | 365/189.02 |
| 4,835,675 | 5/1989 | Kawai | 395/183.21 |
| 4,835,684 | 5/1989 | Kamai | 395/250 |
| 4,845,661 | 7/1989 | Shimada | 364/927.4 |
| 5,079,694 | 1/1992 | Nakagawa et al. | 395/492 |
| 5,179,679 | 1/1993 | Shoemaker | 395/445 |
| 5,224,214 | 6/1993 | Rosich | 395/250 |
| 5,327,539 | 7/1994 | Sudo et al. | 395/325 |
| 5,379,937 | 1/1995 | Becker et al. | 395/250 |
| 5,404,480 | 4/1995 | Suzaki | 395/444 |
| 5,463,756 | 10/1995 | Saito et al. | 395/494 |

*Primary Examiner*—Tod R. Swann
*Assistant Examiner*—Tuan V Thai
*Attorney, Agent, or Firm*—William B. Kempler; Richard L. Donaldson

[57] ABSTRACT

A system for managing write and/or read access priorities between a central processing unit (CPU) and at least one memory (11) which includes mechanism for managing invalid accesses to the memory. The system comprises: an address comparator (19) able to test at each time instant the equality of the write and read addresses in memory, and in the event of equality of the addresses, to generate a signal (35) representative of a condition of invalid access to the memory. A diversion multiplexer circuit (27) is controlled by the invalid access signal (35), in such a way as to connect the bus (33) for reading to the CPU, either to the memory data read bus (31;31') in the event of the absence of an invalid access, or to the bus (29;29') for writing data from the CPU to the memory in the event of invalid access signal being present, so that the memory data write bus is diverted to the read bus by the CPU in the event of an attempted invalid access of the memory by the CPU.

8 Claims, 3 Drawing Sheets

SYSTEM FOR MANAGING WRITE AND/OR READ ACCESS PRIORITIES BETWEEN CENTRAL PROCESSOR AND MEMORY OPERATIONALLY CONNECTED

This application is a continuation of application Ser. No. 08/408,795, filed Mar. 23, 1995, abandoned.

BACKGROUND OF THE INVENTION

The present invention relates to a system for managing write and/or read priority between a central processing unit (CPU) and at least one memory connected to the said central processing unit.

Depending on the speed of execution of the processor of the central processing unit (CPU) and on the memory write or read access performance, problems of access to the memory by the processor in order to carry out a particular write or read operation may occur in certain data processing systems according to the current state of the art.

This is particularly true in so-called pipeline or parallel-architecture structures, in which the microprocessor of the CPU issues multiple write and/or read commands intended for one or more memories, with each clock beat.

Under these conditions, there is a risk of access conflict or of invalid access to a given memory cell when the CPU simultaneously issues a write command and a read command heading for the same memory cell, or more generally when the passband of the CPU is greater than that of the memory.

This has the effect of downgrading the performance of the information exchanges between the CPU and the memory, or even of causing information to be lost.

The purpose of the present invention is to remedy these drawbacks, and to propose a system for managing memory accesses making it possible to avoid the conflicts of access or invalid accesses to a given memory, while optimizing the overall performance of the CPU system and of the associated memories.

SUMMARY OF THE INVENTION

With this aim, the invention relates to a system for managing write and/or read access priorities between a central processing unit (CPU) and at least one memory connected to the central processing unit by at least one write address bus and read address bus and at least one write data bus and read data bus, the central processing unit being designed to access the memory simultaneously via several buses, characterized in that it includes means for managing invalid accesses to the memory, comprising at least:

- one address comparator able to test at each time instant the equality of the write and read addresses in memory, and in the event of equality of the addresses, to generate a signal representative of a condition of invalid access to the memory;
- one diversion multiplexer circuit controlled by the invalid access signal, in such a way as to connect the bus for reading to the CPU, either to the memory data read bus in the event of an absence of an invalid access signal, or to the bus for writing data from the CPU to the memory in the event of an invalid access signal being present, so that the said memory data write bus is diverted to the read bus by the CPU in the event of an attempted invalid access of the memory by the CPU.

According to other characteristics of the device:

the address comparator is connected between a memory read address bus and a memory write address bus. (23:23')

The diversion multiplexer circuit is connected at its two inputs to a memory data write bus on the one hand, and to a memory data read bus on the other hand, and connected at its output to a read bus heading for the CPU.

The system furthermore includes means for placing one or more memory write operations on standby for one or more clock cycles.

The system means for placing on standby includes a write address buffer and a write address multiplexer which are interposed on the memory write address bus, the write address multiplexer having an input connected to the output of the write address buffer, and an input connected to the write address bus.

The means for placing on standby also includes a write data buffer and a write data multiplexer which are interposed on the write data bus, the write data multiplexer having an input connected to the output of the write data buffer, and an input connected to the write data bus.

The system includes as many address comparators as there are writes on standby to be managed simultaneously.

BRIEF DESCRIPTION OF THE DRAWING

The invention will be better understood upon referring to the following description given by way of non-limiting example and to the appended drawings in which.

DETAIL DESCRIPTION OF THE DRAWINGS

Figure 1:
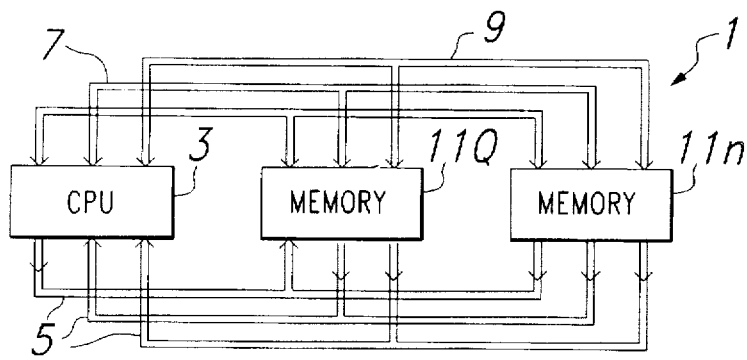
FIG. 1 represents a schematic diagram of an embodiment of a data processing system in which the invention can be used.

Referring to FIG. 1, represented in this figure, merely by way of example, is a system 1 in which the invention can be used. Typically this is a system comprising at least one microprocessor-based digital central processing unit (CPU), linked by a data 5, command 7 and address 9 bus assembly to one or more memories 11a to 11n.

In the case when the number of buses or the number of accesses to a given memory 11i is greater than that which this memory can accept in each clock time interval, there is a possibility of conflict of access or of invalid access to this memory. In the example represented it is assumed that the memory 11a can handle two access requests per clock cycle. However, if the architecture of the CPU permits three access requests to be generated per clock cycle, there is a memory access conflict once three memory accesses are requested by the CPU during the same cycle.

It should be noted that the problem which the invention is intended to solve, as well as the solution, are totally independent of the width of the buses (number of bits), of their direction (write, read or two-way bus), or of the organization of the data on these buses (for example time-multiplexed buses).

Figure 2:
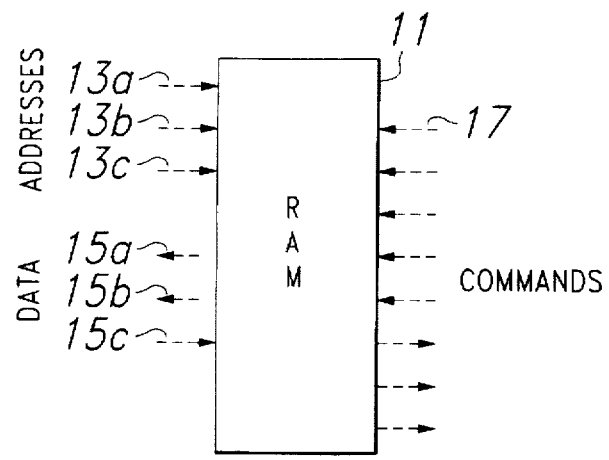
FIG. 2 represents diagrammatically a memory with its data, address and command buses.

In FIG. 2 is represented a particular memory 11 of the system represented in FIG. 1. In this example, the memory 11 has three address buses 13a, 13b, 13c, three data buses 15a, 15b, 15c including two read buses (15a, 15b) and one write bus (15c), as well as a command signal assembly 17 allowing management of memory accesses.

Figure 3:
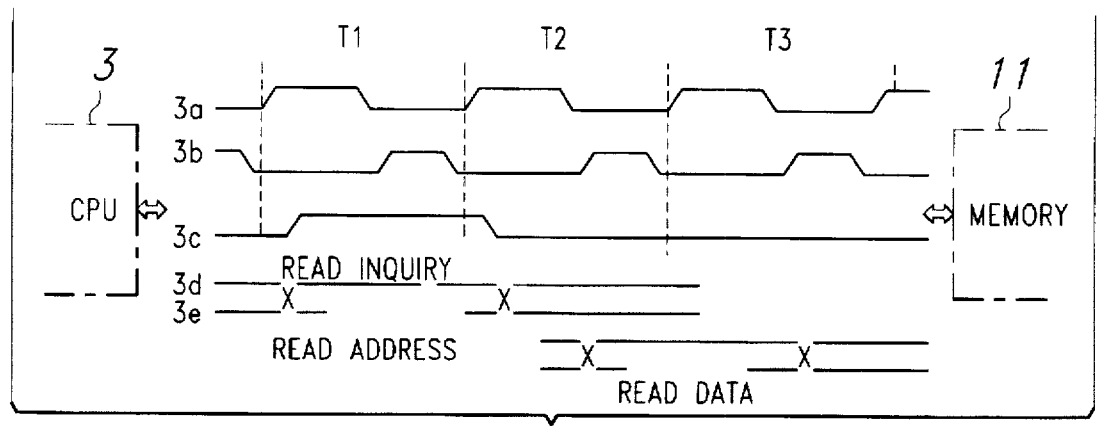
FIG. 3 represents a conventional timing diagram for signals used in reading the memory.

The timing diagram of the memory access signals of FIG. 2 is represented in FIG. 3 for a conventional memory-read operation. The signals represented are those transmitted between the CPU 3, situated to the left of the signals, and the memory 11 according to FIG. 2, situated to the right of the signals. The first two signals represented 3a, 3b are the two phases of a two-phase clock, shifted in time by half a period the one with respect to the other. During the first clock period T1, the CPU issues a read inquiry signal 3c and a read address signal 3d in memory. During the second clock period T2, data read from memory (3e) are awaited by the CPU.

The operation for writing from the CPU to memory (not represented) would consist, in a similar way, in issuing from the CPU a write enquiry and a write address during the first clock period and then in writing the data to memory during the second clock period.

Figure 4:
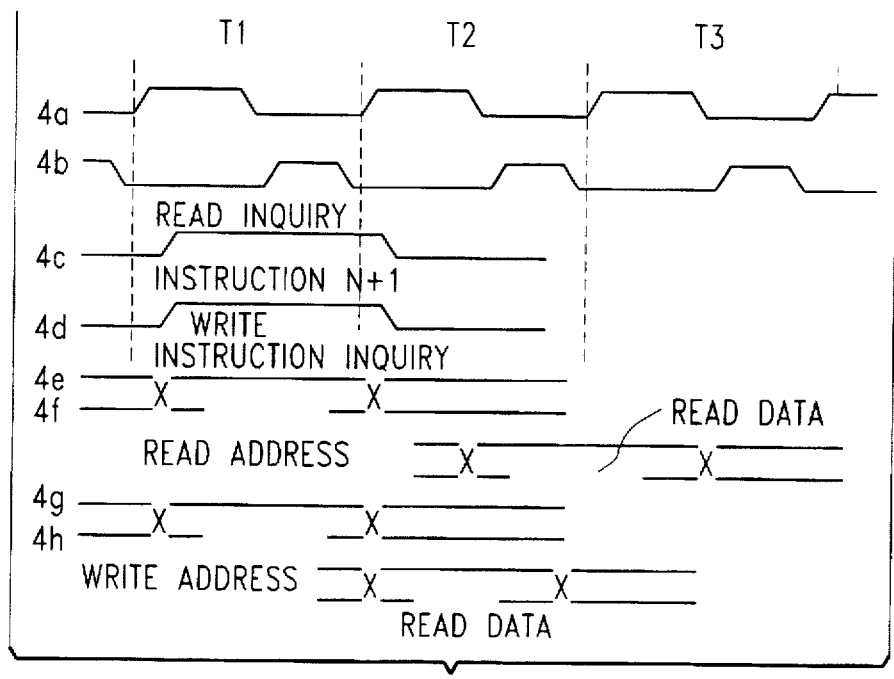
FIG. 4 represents a configuration of the read/write signals corresponding to an invalid access to a memory which permits just one access per clock cycle.

Referring to FIG. 4, write or read instructions which are issued sequentially by the CPU find themselves, owing to a pipeline- or parallel-type architecture, in a simultaneous memory access request situation. Thus, a memory write access request instruction 4d may occur at the same moment (T1) as the read access request 4c of the next instruction. In order to manage this problem of simultaneous access, the read of order N+1 must be performed before the write of order N, which corresponds to an invalid access if the write and the read relate to the same address, and represents a reversal of the normal order of access to a memory.

Indeed, the write enquiry of order N and read enquiry of order N+1 may relate to the same address in memory. Since the data at this memory address have not yet been updated by a write of order N, the read enquiry of order N+1 would have the effect of erroneously reading the information in memory, since the latter has not yet been updated by the write enquiry of order N.

It is seen that in such a case of memory access conflict, it is possible to obtain false or old information from the memory.

Figure 5:
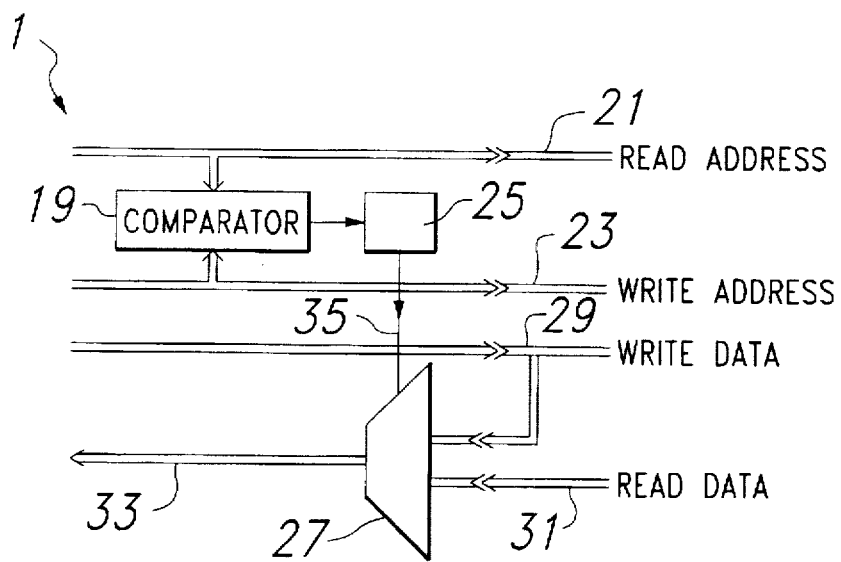
FIG. 5 represents a schematic diagram of a first embodiment of the access management system according to the invention.

In order to solve this problem, the invention proposes a system 1 for memory access management, such as represented diagrammatically in FIG. 5. The access management device 1 according to the invention is implemented within the CPU, in the memory or in an intermediate module, and includes an address comparator 19 arranged between the read address bus 21 and the write address bus 23 which are connected to the memory, so as to compare two by two the write and read addresses at each clock cycle. The output 24 of the comparator 19 is connected, possibly across a one-bit register 25, to the command input of a diversion multiplexer 27. The latter receives at input, on the one hand the data write bus 29 going from the data output of the CPU to the data input of the memory, and on the other hand the bus 31 for reading data originating from the memory. The output 33 of the diversion multiplexer 27 is connected to the data input of the CPU.

The access management device 1 according to FIG. 5 then operates as follows: once the address comparator 19 detects the equality, for a given period, of the memory read address (bus 21) and of the memory write address (bus 23), this corresponding to a case of access conflict or of invalid access, it generates on its output 24 an equality signal, which constitutes a signal representative of an invalid access condition. This signal consists for example of the passing of a bit at the "one" value from the comparator 19 to the one-bit register 25 which is transmitted by way of the one-bit register 25 to the command input 35 of the diversion multiplexer 27.

While in the normal operating regime, the output 33 of the diversion multiplexer 27 is connected to the bus 31 for reading data originating from the memory. The command bit 35 originating from the command register 25 toggles the diversion multiplexer 27 so that the data transmitted to its output 33 correspond to the data which are diverted and tapped off directly from the memory write bus 29 before the memory write proper can be executed.

Thus, the false (old) data originating from the memory on the memory read bus 31 are momentarily replaced by the data transmitted by the CPU to the memory on the data write bus 29. In this way, the read datum of order N+1 which the CPU has requested is tapped off directly from the write bus 29 by shunting the memory and the memory read bus 31, thus enabling the CPU to receive on its memory read bus 33 the updated valid data, and not old data, this being so even in the case of simultaneous write and read access, from the CPU to the memory.

However, the solution according to FIG. 5 does not by itself make it possible to solve the problem raised by too large a number of simultaneous access requests on the part of the CPU, to the same memory cell. Such a situation can nevertheless occur when the CPU has a passband greater than that of the memory, so that it generates more access requests per clock cycle than the memory can normally process. Such a case is represented in FIG. 6 where it is assumed that the memory can process two access enquiries per clock period.

The CPU presents simultaneously (time interval T1) the memory with two read enquiries A1, B1 and one write enquiry C1, and then with two simultaneous read enquiries A2, B2 in timer interval T2. During time interval T2 there is therefore a memory access conflict since, as represented in line 6f, the memory read A2 would coincide with the write C1, and this double access during the same period is invalid.

It should be noted that this problem would not arise in a system 1 identical to that represented in FIG. 1, in which each memory has precisely one write bus and two read buses, so that there would be no memory access conflict.

Figure 6:
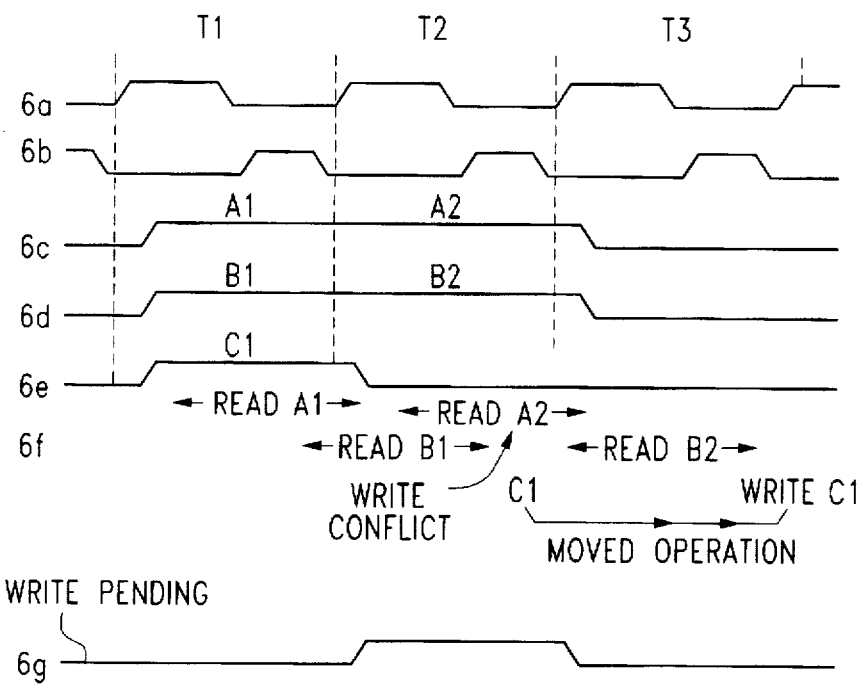
FIG. 6 represents the principle of the solution to an access conflict generated by too great a number of simultaneous memory accesses.

To solve the access conflict problem such as illustrated in FIG. 6, the invention proposes firstly to process in series the memory read accesses, namely A1 and B1 in time period T1, and then A2 and B2 in time period T2, and to process the write enquiry C1 only at the first possible occasion, that is to say in time period T3 in this instance, as represented by the arrow moving the write enquiry C1 to cycle T3. The access C1 has therefore been placed on standby in order to give priority to the processing of the accesses A1, B1, A2, B2.

To determine the time period during which the write corresponding to the write enquiry on standby C1 becomes possible, a "write pending" signal 6g is used, which goes high when the access conflict occurs. The occurrence of this signal is used to store the address and the write datum in memory (as described further on) until they can be used. When the access conflict disappears (time period T3), the write pending signal becomes inactive again and the write on standby is performed in memory.

Figure 7:
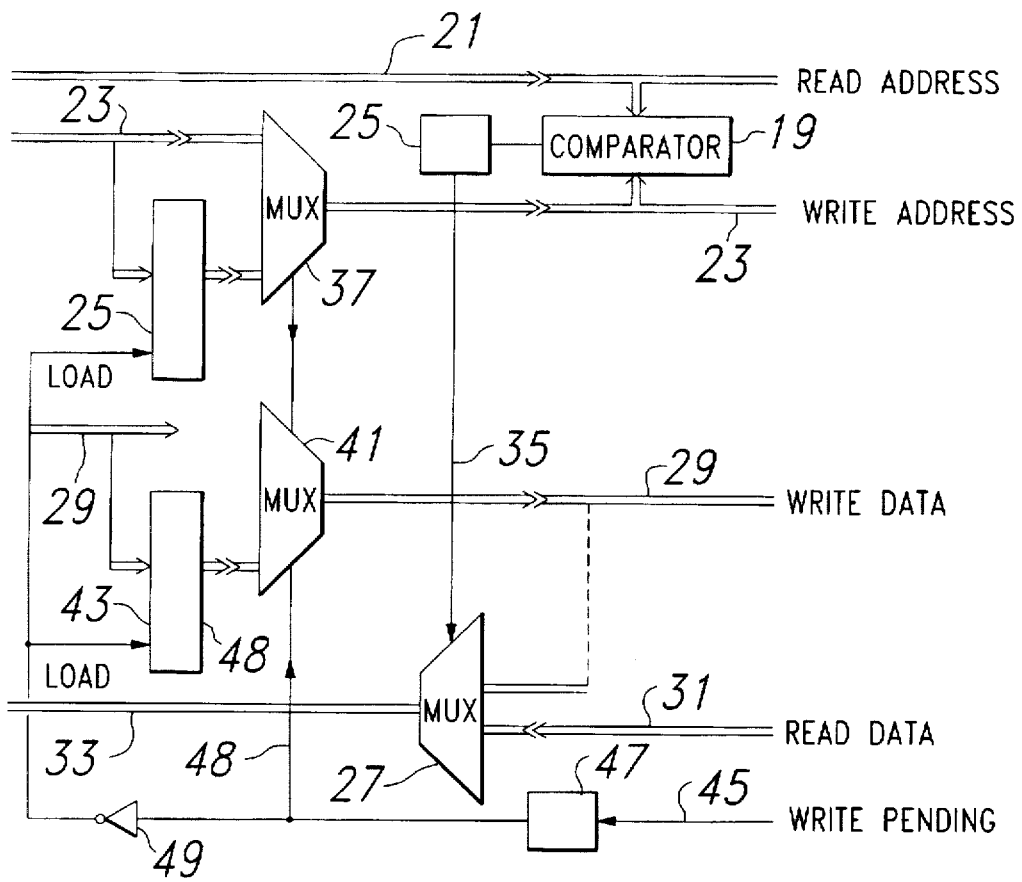
FIG. 7 represents a schematic diagram of another embodiment of the memory access management system, implementing the principle according to FIG. 6.

An example implementation of the solution consisting in deferring the write operation is described in conjunction with FIG. 7.

In this figure, the same notation as in FIG. 5 has been retained for the same elements, apart from the addition of a prime "'" to indicate equivalent but not identical elements. Thus, the buses 23, 23' of FIG. 7 correspond to the write address bus 23 of FIG. 5.

In order to implement the holding and shifting in time of a write command in case of memory access conflict, the invention makes provision to interpose on the write address bus 23, upstream of the read and write address comparator 19, an extra multiplexer circuit, the address multiplexer 37. In this embodiment, the address write bus 23 exiting the CPU is connected to the input of the address multiplexer 37, whose output is connected to the write address bus 23' going to the memory. The other input of the address multiplexer 37 is connected to the output of an address buffer register 39 whose input is connected in parallel to the address write bus 23 issuing from the CPU.

Similarly, the write data bus 29 issuing from the CPU is connected to the input of a data multiplexer 41 whose output is connected on the one hand to the bus 29' for writing data to the memory, and on the other hand to an input of the diversion multiplexer 27 described earlier. Moreover, the other input of the data multiplexer 41 is connected to the output of a data buffer register 43 whose input is connected in parallel to the write data bus 29 issuing from the CPU.

The address multiplexer 37 and data multiplexer 41 are commanded over the line 48, possibly across a synchronizing toggle 47, by a "write pending" detection signal 45 originating from the memory. The output of this toggle 47 is linked on the one hand to the command line 48 of the multiplexers 37, 41 and on the other hand, after inversion by an inverter 49, to the load inputs of the address buffer register 39 and data buffer register 43.

Note that the "write pending" signal is produced in a known manner by the interface logic of the memory, from the command signals detailed in FIG. 6, and transmitted directly from the CPU to the memory.

The access management device such as represented in FIG. 7 then operates as follows: once the "write pending" signal is active, the write datum originating from the CPU on the data write bus 29 is held in the data buffer register 43, and likewise the addresses present on the bus 23 for the write addresses issued by the CPU are held in the address buffer register 39. The address multiplexer 37 is controlled by the command 48 in such a way as to transfer to the bus 23' the address on standby in the buffer 39. Likewise, the data multiplexer 41 is controlled by the command 48 in such a way as to transfer to the bus 29' the datum on standby in the buffer 43.

While the "write pending" signal is active, the address comparator 19 is supplied with the address of the write on standby, present on the write address bus 23'. Once the address comparator 19 detects equality between the current read address on the bus 21' and the address of the write on standby on the bus 23', the equality signal 35 is active, thus making it possible to command the diversion multiplexer 27. The latter being supplied with the write datum on standby on the bus 29', it despatches on the bus 33 the write datum on standby, substituting it for the erroneous (old) read datum present on the bus 31'.

Once the write on standby has been processed at memory level, the write pending signal 45 becomes inactive, and thereby the multiplexers 37, 41 are reset to their initial state by the command 48. Thereby, the bus 23 is reconnected with the bus 23' and the bus 29 is reconnected with the bus 29', thus bringing about to a configuration similar to that of FIG. 5.

It should be noted that FIG. 7 describes the postponement of a write operation in case of access conflict, only for a single memory read bus 31'. If the system includes several read buses (cf. FIG. 1), the write buses (23', 29') could be in conflict with several read buses, and consequently, there would be reason to provide as many address comparators 19 and diversion multiplexers 27 as there are memory read buses.

Finally, it could happen that the CPU may wish to undertake a memory write operation, while there is already an earlier write operation pending. In this case, it will be necessary to detect this event by means of combinatorial logic within the scope of those skilled in the art, and then to halt the write from the CPU for a number of clock cycles which is sufficient to terminate the pending memory write. As a variant, if the halting of the CPU cannot be tolerated, it will be necessary to increase the capacity or the number of the address buffer registers 39 and data 43 buffer registers so as to store the addresses and data of several successive pending write operations.

Although the invention has been described in the context of a system favouring read memory accesses as opposed to write accesses, those skilled in the art will readily be able to adapt it to a system favouring write accesses and postponing till later the pending read accesses.

From the foregoing, it emerges that the device for managing accesses to a memory according to the present invention solves the drawbacks of the state of the art, and in particular makes it possible to solve the conflicts of access by a CPU of large passband, to a memory of smaller passband.

We claim:

1. A system for managing write and/or read access priorities between a central processing unit and at least one memory connected to the central processing unit wherein at least one write address bus and read address bus are included with one write data bus and read data bus in interconnected relationship between the central processing unit and said at least one memory for enabling said central processing unit to access said at least one memory; said system comprising:

an address comparator coupled between said write address bus and said read address bus for comparing at respective time instants the write address appearing on the write address bus and the read address appearing on the read address bus, said address comparator being responsive to the write address and the read address being identical for generating an output indicative of a condition of invalid access to said memory as an invalid access signal;

a diversion multiplexer having first and second inputs and an output;

one of said read data bus and said write data bus being segmental and including a first portion connected to the first input of said diversion multiplexer and a second portion connected to the output of said diversion multiplexer such that said diversion multiplexer is interposed between the first and second portions of the segmental one of said read data bus and said write data bus;

a shunt connection extending from the other of said read data bus and said write data bus to the second input of said diversion multiplexer and connected thereto; and said diversion multiplexer having a further control input connected to the output of said address comparator, said diversion multiplexer connecting the first and second portions of said segmental one of said read data bus and said write data bus together in the absence of receiving an invalid access signal from said address comparator at the control input thereof or alternatively connecting the shunt connection extending from the other of said read data bus and said write data bus via the second input of said diversion multiplexer to the second portion of said segmental one of said read data bus and said write data bus while disconnecting the first portion of said segmental one of said read data bus and said write data bus from the second portion thereof in response to receiving an invalid access signal from said address comparator at the control input thereof, such that data in the other of said read data bus and said write data bus is diverted via said shunt connection and said diversion multiplexer to the second portion of said segmental one of said read data bus and said write data bus.

2. A system as set forth in claim 1, wherein said read data bus is said segmental one of said read data bus and said write data bus;

said shunt connection extending from said write data bus to the second input of said diversion multiplexer and connected thereto; and said diversion multiplexer connecting the first and second portions of said segmental read data bus together in the absence of receiving an invalid access signal from said address comparator at the control input thereto or alternatively connecting the shunt connection extending from said write data bus via the second input of said diversion multiplexer to the second portion of said segmental read data bus while disconnecting the first portion of said segmental read data bus from the second portion thereof in response to receiving an invalid access signal from said address comparator at the control input thereof, such that data in said write data bus is diverted via said shunt connection and said diversion multiplexer to the second portion of said segmental read data bus.

3. A system as set forth in claim 1, further including a one-bit register interposed between the output of said address comparator and the control input of said diversion multiplexer and respectively connected thereto, said one-bit register receiving a bit at the "one" value from the output of said address comparator representative of equality between the write address and the read address as compared by said address comparator and transmitting the bit at the "one" value to the control input of said diversion multiplexer as an invalid access signal.

4. A system as set forth in claim 1, further including means interconnected with said address comparator via one set of address and data buses of one of read and write operations for placing at least one memory operation of said one of read and write operations on standby for at least one clock cycle.

5. A system as set forth in claim 4, wherein write operations are the said one of read and write operations placed on standby for at least one clock signal by said means for placing on standby.

6. A system as set forth in claim 4, wherein said means for placing on standby includes:

one of a write and a read address multiplexer having first and second inputs and an output;

one of a write and a read address buffer memory corresponding to said one address multiplexer and having an input and an output;

one of said write and read address buses being segmental and having first and second portions, the first portion of said segmental address bus being connected to the first input of said address multiplexer, the second portion of said segmental address bus being connected to the output of said address multiplexer and to an input of said address comparator in coupling the second portion of said segmental address bus to said address comparator;

the first portion of said segmental address bus also being connected to the input of said address buffer memory;

the output of said address buffer memory being connected to the second input of said address multiplexer;

said address multiplexer having a further control input;

a control conductor received by the control input of said address multiplexer;

toggle switch means interposed in the control conductor and having an output connected to the control input of said address multiplexer, the input of said toggle switch means being adapted to receive one of a write pending signal from the central processing unit or a read pending signal from the memory and transmitting the said one pending signal from the output thereof to the control input of said address multiplexer; and the data present on said one of the write and read address buses being held in said address buffer memory to postpone said one of a read and write operation dependent upon the receipt of the said one pending signal by said toggle switch means.

7. A system as set forth in claim 6, wherein said one of a write and a read address multiplexer is a write address multiplexer;

said one of a write and a read address buffer memory is a write address buffer memory;

said write address bus is said segmental one of said write and read address buses; and said one of a write pending signal or a read pending signal is a write pending signal, such that the data present on said write address bus is held in said write address buffer memory to postpone a write operation dependent upon the receipt of the write pending signal by said toggle switch means.

8. A system as set forth in claim 7, wherein said means for placing on standby further includes:

a write data multiplexer having first and second inputs, an output, a control input, and a control output;

a write data buffer memory corresponding to said write data multiplexer and having an input and an output;

said write data bus being segmental and having first and second portions, the first portion of said segmental write data bus being connected to the first input of said write data multiplexer, the second portion of said segmental write data bus being connected to the output of said write data multiplexer;

the first portion of said segmental write data bus also being connected to the input of said write data buffer memory;

the output of said write data buffer memory being connected to the second input of said write data multiplexer; and said control conductor extending through the control input and the control output of said write data multiplexer to the control input of said write address multiplexer.

* * * * *